(12) United States Patent
Zhang et al.

(10) Patent No.: US 10,952,086 B2
(45) Date of Patent: Mar. 16, 2021

(54) FAST RATE ADAPTATION FOR WLAN DEVICES

(71) Applicant: NXP USA, Inc., Austin, TX (US)

(72) Inventors: Yan Zhang, Palo Alto, CA (US); Xiayu Zheng, San Jose, CA (US); Bo Yu, San Jose, CA (US); Jinjing Jiang, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 13 days.

(21) Appl. No.: 16/386,331

(22) Filed: Apr. 17, 2019

(65) Prior Publication Data

US 2019/0327626 A1 Oct. 24, 2019

Related U.S. Application Data

(60) Provisional application No. 62/662,072, filed on Apr. 24, 2018.

(51) Int. Cl.
*H04W 24/08* (2009.01)
*H04W 72/04* (2009.01)
*H04L 5/00* (2006.01)
*H04W 84/12* (2009.01)

(52) U.S. Cl.
CPC ........... *H04W 24/08* (2013.01); *H04L 5/0048* (2013.01); *H04W 72/0446* (2013.01); *H04W 84/12* (2013.01)

(58) Field of Classification Search
CPC . H04W 24/08; H04W 72/0446; H04W 84/12; H04L 5/0048
See application file for complete search history.

(56) References Cited

U.S. PATENT DOCUMENTS

| | | | | |
|---|---|---|---|---|
| 6,810,428 B1* | 10/2004 | Larsen | ................. | H04B 7/2606 709/238 |
| 2003/0137194 A1* | 7/2003 | White | ................. | B60R 16/0215 307/10.1 |
| 2017/0338956 A1* | 11/2017 | Badawy | ............ | H04W 12/0401 |

OTHER PUBLICATIONS

Pavon et al., "Link Adaptation Strategy for IEEE 802.11 WLAN via Received Signal Strength Measurement", IEEE International Conference on Communications, pp. 1108-1113, May 11-15, 2003.
Kamerman et al., "WaveLAN®-II: A High-Performance Wireless LAN for the Unlicensed Band", Bell Labs Technical Journal, pp. 118-133, Summer 1997.
Lacage et al., "IEEE 802.11 Rate Adaptation: A Practical Approach", HAL archive, INRIA Sophia Antipolis, pp. 1-29, May 19, 2006.

(Continued)

*Primary Examiner* — Duc C Ho (57) ABSTRACT

A method for rate adaptation in a communication device includes, during a time interval, transmitting over a wireless channel to a peer communication device both (i) communication packets that carry user data, at a communication data rate, and (ii) channel-probing packets for probing channel conditions, at a channel-probing data rate that is derived from the communication data rate. A first statistical performance of the communication packets, and a second statistical performance of the channel-probing packets, are estimated over the time interval. The communication data rate is set for a subsequent time interval based on at least one of the first statistical performance and the second statistical performance.

20 Claims, 3 Drawing Sheets

(56) References Cited

OTHER PUBLICATIONS

Bicket, J.C., "Bit-rate Selection in Wireless Networks", Master Thesis, Massachusetts Institute of Technology, pp. 1-50, Feb. 2005.
IEEE Standard 802.11AX, "IEEE Standard for Local and Metropolitan Area Networks—Link Aggregation", pp. 1-163, Nov. 3, 2008.
IEEE Standard 802.11ac, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz", pp. 1-425, Dec. 2013.
IEEE Standard 802.11n, "IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", pp. 1-536, Oct. 29, 2009.
IEEE Standard 802.11p, "IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments", pp. 1-51, Jul. 2010.

\* cited by examiner

FAST RATE ADAPTATION FOR WLAN DEVICES

CROSS-REFERENCE TO RELATED APPLICATIONS

This application claims the benefit of U.S. Provisional Patent Application 62/662,072, filed Apr. 24, 2018, whose disclosure is incorporated herein by reference.

FIELD OF THE DISCLOSURE

The present disclosure relates generally to wireless communication, and particularly to methods and systems for rate adaptation in communication devices.

BACKGROUND

Various techniques have been proposed for adapting the data rate of a wireless communication link in a Wireless Local Area Network (WLAN). For example, Kamerman and Monteban describe a rate adaptation algorithm referred to as Automatic Rate Fallback (ARF), in "WaveLAN-II®: A High-Performance Wireless LAN for the Unlicensed Band," Bell Labs Technical Journal, summer issue, 1997, pages 118-133. An improvement of ARF, referred to as Adaptive ARF (AARF), is described by Lacage et al., in "IEEE 802.11 Rate Adaptation: A Practical Approach," HAL archive, HAL Id: inria-00070784, May 19, 2006.

Pavon and Choi describe a link adaptation algorithm that adapts the transmission rate to the current link condition based on the received signal strength measured from received frames, in "Link Adaptation Strategy for IEEE 802.11 WLAN via Received Signal Strength Measurement," Proceedings of the 2003 IEEE International Conference on Communications (ICC '03), June, 2003, pages 1108-1113.

Bicket describes a bit-rate selection algorithm called SampleRate, in "Bit-rate Selection in Wireless Networks," MSc Thesis, Massachusetts Institute of Technology, February, 2005. SampleRate sends most data packets at a bit-rate believed to provide the highest throughput. SampleRate periodically sends a data packet at some other bit-rate in order to update a record of that bit-rate's loss rate. SampleRate switches to a different bit-rate if the throughput estimate based on the other bit-rate's recorded loss rate is higher than the current bit-rate's throughput.

The description above is presented as a general overview of related art in this field and should not be construed as an admission that any of the information it contains constitutes prior art against the present patent application.

SUMMARY

An embodiment that is described herein provides a method for rate adaptation in a communication device. The method includes, during a time interval, transmitting over a wireless channel to a peer communication device both (i) communication packets that carry user data, at a communication data rate, and (ii) channel-probing packets for probing channel conditions, at a channel-probing data rate that is derived from the communication data rate. A first statistical performance of the communication packets, and a second statistical performance of the channel-probing packets, are estimated over the time interval. The communication data rate is set for a subsequent time interval based on at least one of the first statistical performance and the second statistical performance.

In some embodiments, the method further includes deciding, based on the first statistical performance of the communication packets, whether or not to transmit the channel-probing packets in the subsequent time interval. In an embodiment, the method further includes deciding, based on the first statistical performance of the communication packets, whether to increase or decrease the channel-probing data rate in the subsequent time interval relative to the time interval.

In an example embodiment, the method further includes: when the first statistical performance of the communication packets is better than a first performance threshold, increasing the channel-probing data rate for the channel-probing packets in the subsequent time interval relative to the time interval; when the first statistical performance is poorer than a second performance threshold, decreasing the channel-probing data rate in the subsequent time interval relative to the time interval; and when the first statistical performance is between the first performance threshold and the second performance threshold, deciding not to transmit the channel-probing packets in the subsequent time interval.

In a disclosed embodiment, setting the communication data rate for the subsequent time interval includes: when the second statistical performance of the channel-probing packets is better than a first performance threshold, increasing the communication data rate in the subsequent time interval relative to the time interval; when the second statistical performance is poorer than a second performance threshold, decreasing the communication data rate in the subsequent time interval relative to the time interval; and when the second statistical performance is between the first performance threshold and the second performance threshold, retaining the communication data rate in the subsequent time interval as in the time interval.

In some embodiments, the method further includes, upon initial establishment of a link with the peer communication device or following inactivity of the link, initializing the communication data rate based on a quality of a reverse-channel signal received from the peer communication device. In an embodiment, estimating the first statistical performance and the second statistical performance includes estimating performance measures indicative of throughputs of the communication packets and of the channel-probing packets. Additionally or alternatively, estimating the first statistical performance and the second statistical performance includes estimating performance measures indicative of error rates of the communication packets and of the channel-probing packets.

In an embodiment, estimating the first statistical performance and the second statistical performance is performed based only on first-transmissions of the communication packets and the channel-probing packets, excluding retransmissions. In a disclosed embodiment, the method includes, at least at a given time, setting the communication data rate to be different from the channel-probing data rate.

There is additionally provided, in accordance with an embodiment that is described herein, a communication device including a transmitter and a processor. The transmitter is configured to transmit signals over a wireless channel to a peer communication device. The processor is configured to: during a time interval, transmit to the peer communication device, using the transmitter, both (i) communication packets that carry user data, at a communication data rate, and (ii) channel-probing packets for probing channel conditions, at a channel-probing data rate that is derived from the communication data rate; estimate, over the time interval, a first statistical performance of the communication packets and a second statistical performance of the channel-probing packets; and set the communication data rate for a subsequent time interval based on at least one of the first statistical performance and the second statistical performance.

The present disclosure will be more fully understood from the following detailed description of the embodiments thereof, taken together with the drawings in which:

DETAILED DESCRIPTION OF EMBODIMENTS

In various communication applications it is desirable to adapt the rate with which data is transmitted over a communication channel, to account for variations in channel conditions. An optimal rate adaptation process enables a communication system to operate at the highest possible data rate that is achievable at any given time, while maintaining communication quality at a specified acceptable level.

In practice, optimal rate adaptation is often challenging to achieve, for example when channel variations are fast and strong. Such unstable channel conditions may be due, for example, to motion of the transmitter or receiver, multipath fading, packet collisions caused by other simultaneous transmissions, and/or interference from other sources.

Rate adaptation becomes even more problematic as the number of possible data rates (e.g., the number of spatial streams and the number of Modulation and Coding Schemes—MCSs) grows. The IEEE 802.11ax standard, for example, specifies the use of up to eight spatial streams and up to twelve different MCSs. Evaluating such a large number of possible data rates is computationally complex and time consuming, and may fail altogether if the channel variations are too rapid.

Embodiments that are described herein provide improved methods and apparatus for performing rate adaptation in WLANs and other communication systems. The disclosed techniques perform well in the presence of rapid channel variations, regardless of the number of spatial streams and the possible number of data rates. The disclosed techniques are not limited, however, to such harsh conditions, but are useful for any channel.

In some disclosed embodiments, a communication device transmits communication packets that carry user data to a peer communication device over a wireless channel. In order to achieve fast and reliable rate adaptation, the communication device also transmits channel-probing packets for probing the channel conditions. The channel-probing packets are typically interleaved with the communication packets, e.g., transmitted in sequence as long as the communication device is not busy transmitting a communication packet.

In some embodiments, the channel-probing packets carry user data to the peer communication device, in addition to serving for probing the channel conditions. In other embodiments, the channel-probing packets do not carry user data, and serve only for probing channel conditions. In yet other embodiments, one or more of the channel-probing packets carry user data, and one or more other channel-probing packets do not carry user data.

The channel-probing packets are typically small and transmitted at short intervals, to enable accumulation of reliable performance statistics. In some embodiments, the size and packet rate of the probing packets are selected so as to cause minimal degradation in the throughput and latency of the communication packets.

Based on feedback that is received from the peer communication device, the communication device estimates a statistical performance of the communication packets and a statistical performance of the channel-probing packets. Based on the estimated performance statistics, the communication device configures subsequent packet transmission, e.g., decides whether or not to transmit channel-probing packets in the subsequent time interval, and at what data rate, and sets the data rate of the communication data packets for the subsequent time interval.

The data rate with which the communication packets are transmitted is referred to herein as "communication data rate." The data rate with which the channel-probing packets are transmitted is referred to herein as "probing data rate." Typically, the communication device chooses both the communication data rate and the probing data rate from a predefined set of possible data rates, each possible data rate corresponding to a respective number of spatial streams ($N_{ss}$) and a respective Modulation and Coding Scheme (MCS). In the present context, terms such as "higher data rate, "lower data rate," "next-higher data rate," "next-lower data rate," "incrementing a data rate," "decrementing a data rate," "highest data rate" and "lowest data rate" refer to the order of data rates (or the order of $\{MCS, N_{ss}\}$ combinations) in the predefined set used by the communication device.

In the disclosed embodiments, in setting the probing data rate, the communication device does not test all possible probing data rates exhaustively, and also does not select the probing data rate arbitrarily, e.g., at random. Rather, the communication device derives the probing data rate from the currently-used communication data rate. This technique reduces computational complexity and speeds-up the rate adaptation process significantly.

In an example embodiment, the communication device sets the probing data rate for the next time interval to be one rate below the communication data rate, or one rate above the communication data rate, depending on the performance of the communication packets in the present time interval. In addition, the communication device sets the communication data rate for the next time interval to be one rate below the probing data rate, the same as the probing data rate, or one rate above the probing data rate, depending on the performance of the channel-probing packets in the present time interval.

By using channel-probing packets in the manner described herein, the communication device is able to evaluate, efficiently and on an on-going basis, the performance of data rates other than the currently-used communication data rate. Since this evaluation occurs in parallel with normal communication, the communication device is able to adapt the communication data rate quickly, and in particular to respond quickly and accurately to variations in channel conditions.

Figure 1:
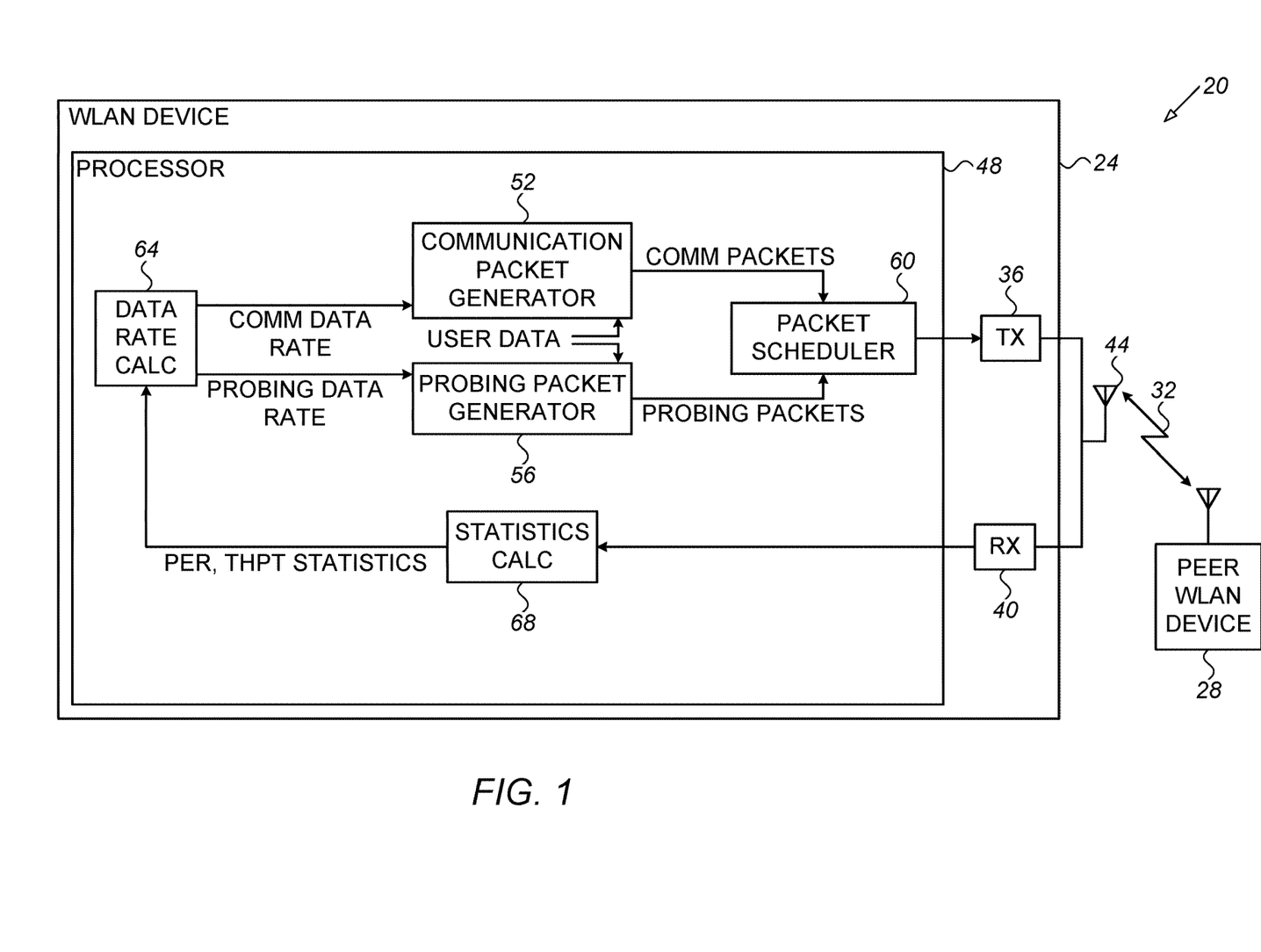
FIG. 1 is a block diagram that schematically illustrates a Wireless Local Area Network (WLAN), in accordance with an embodiment that is described herein.

FIG. 1 is a block diagram that schematically illustrates a Wireless Local Area Network (WLAN) 20, in accordance with an embodiment that is described herein. WLAN 20 comprises a WLAN device 24 that communicates with a peer WLAN device 28 over a wireless channel 32. In various embodiments, WLAN 20 operates in accordance with any suitable WLAN standard of protocol, such as any of the IEEE 802.11 family of standards. Some non-limiting example variants of this standard include 802.11n, 802.11ac, 802.11ax and 802.11p.

Moreover, the disclosed techniques are not limited to WLANs, and are applicable in various other suitable communication systems that involve rate adaptation between communication devices. In the present context, therefore, WLAN devices 24 and 28 are regarded as non-limiting examples of communication devices.

In an example embodiment, WLAN device 24 comprises an Access Point (AP) and peer WLAN device 28 comprises a Station (STA). In an alternative embodiment, WLAN device 24 comprises a STA and peer WLAN device 28 comprises an AP. The disclosed techniques are also applicable in peer-to-peer scenarios, e.g., when WLAN devices 24 and 28 both comprise STAs or when WLAN devices 24 and 28 both comprise APs.

Typically, WLAN device 24 comprises a transmitter (TX) 36 for transmitting WLAN signals to peer WLAN devices, a receiver (RX) 40 for receiving WLAN signals from peer WLAN devices, one or more antennas 44, and a processor 48 that carries out various processing functions of the WLAN device. Among other tasks, processor 48 performs fast rate adaptation using methods that are described in detail herein.

In the embodiment of FIG. 1, processor 48 comprises a communication packet generator 52 and a probing packet generator 56. Communication packet generator 52 generates communication packets that carry user data, for transmission to peer WLAN device 28. Probing packet generator 56 generates channel-probing packets (also referred to as "probing packets" for brevity) for estimation of the current conditions of channel 32. (As noted above, in some embodiments at least some of the probing packets carry user data as well.) A packet scheduler 60 schedules transmission of the communication packets and the probing packets, and provides both types of packets to TX 36 for transmission. The joint use of communication packets and probing packets for rate adaptation is explained further below.

In an embodiment, any of the communication packets and any of the probing packets comprise, for example, a Medium Access Control (MAC) Protocol Data Unit (MPDU) or an Aggregate MPDU (A-MPDU), as specified, for example, in the IEEE 802.11 standards.

In the present example, processor 48 further comprises a statistics calculator 68 and a data rate calculator 64. Statistics calculator 68 calculates statistical performance measures of channel 32, based on feedback information received from peer WLAN device 28 via RX 40.

Non-limiting examples of feedback information comprise Acknowledgement (ACK) messages received in response to respective MPDUs, and/or of Block-ACK (BA) messages received in response to respective A-MPDUs, as specified, for example, in the IEEE 802.11 standards.

Non-limiting examples of statistical performance measures, calculated by statistics calculator 68, comprise Packet Error Rates (PERs) of communication packets and/or of probing packets, average throughputs achieved by communication packets and/or probing packets, or any other suitable performance measure.

In some embodiments, statistics calculator 68 calculates the statistical performance based only on the first transmission of each packet. In other words, statistics calculator 68 excludes packet retransmissions from the calculation of statistical performance. The PER calculated in these embodiments is also referred to as "first-transmission PER" and is defined as the ratio between the number of failed first transmissions and the total number of first transmissions of packets (for a given data rate and in a given time interval). Similarly, the throughput calculated in these embodiments is also referred to as "first-transmission throughput" and is defined as the number of bits that were successfully delivered via first transmissions of packets, divided by the total duration of first packet transmissions (for a given data rate and in a given time interval).

In an embodiment, data rate calculator 64 uses the statistical performance measures, calculated by statistics calculator 68, for calculating and setting a data rate for the communication packets (referred to herein as "communication data rate") and a data rate for the probing packets (referred to herein as "probing data rate"). These data rates (typically expressed in bits per unit time) are not to be confused with packet rates (typically expressed in packets per unit time). At certain times the communication data rate may be the same as the probing data rate. At other times the communication data rate and the probing data rate are different.

The WLAN and WLAN-device configurations depicted in FIG. 1 are an example configurations, which were chosen solely for the sake of conceptual clarity. In alternative embodiments, any other suitable WLAN and/or WLAN-device configurations can be used. For example, although FIG. 1 depicts only two WLAN devices, for clarity, real-life WLANs typically comprise a larger number of WLAN devices. Elements that are not mandatory for understanding of the disclosed techniques have been omitted from the figure for the sake of clarity.

The various elements of WLAN device 24, e.g., TX 36, RX 40, processor 48, and the elements of processor 48 such as communication packet generator 52, probing packet generator 56, packet scheduler 60, data rate calculator 64, statistics calculator 68, may be implemented using dedicated hardware or firmware, such as using hard-wired or programmable logic, e.g., in an Application-Specific Integrated Circuit (ASICs) or Field-Programmable Gate Array (FPGA), using software, or using a combination of hardware and software elements.

Some functions of WLAN device 24, e.g., some or all of the functions or elements of processor 48, may be implemented using a programmable processor, e.g., a Digital Signal Processor (DSP), which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
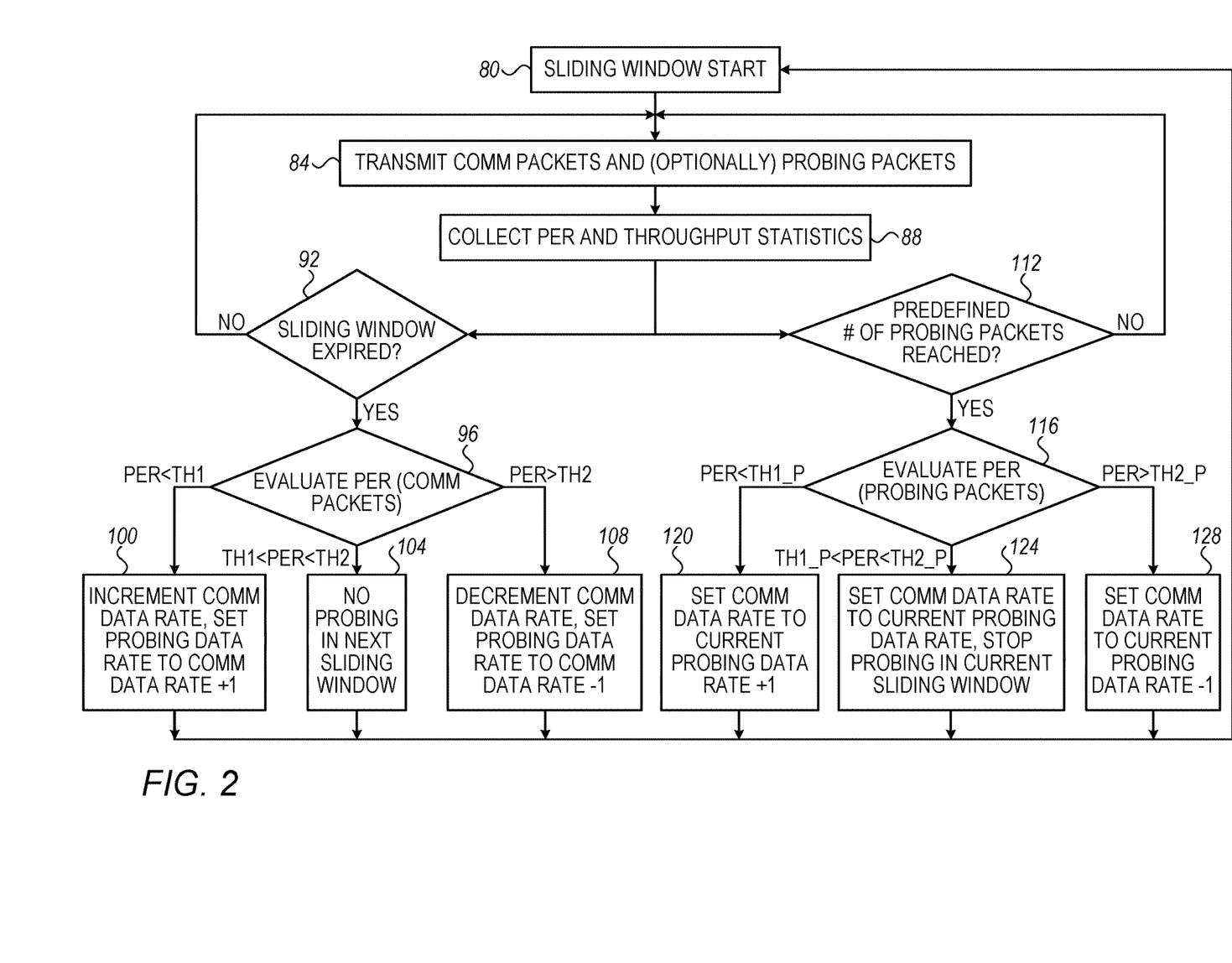
FIG. 2 is a flow chart that schematically illustrates a method for rate adaptation in the WLAN of FIG. 1, in accordance with an embodiment that is described herein.

FIG. 2 is a flow chart that schematically illustrates a method for rate adaptation in WLAN device 24 of FIG. 1, in accordance with an embodiment that is described herein.

Typically, the method of FIG. 2 is carried out when WLAN device 24 and peer WLAN device 28 already have a WLAN link established between them. In some embodiments, the method is preceded by an initialization process that sets an initial value for the communication data rate. In an example embodiment, the initialization process is based on a reciprocity assumption, i.e., that the channel attenuation is similar in the forward channel (from WLAN device 24 to peer WLAN device 28) and in the reverse channel (from peer WLAN device 28 to WLAN device 24). In this embodiment, data rate calculator 24 initializes the communication data rate based on a Received Signal Strength Indication (RSSI) and/or Signal-to-Noise Ratio (SNR) of the signal received from peer WLAN device 28. Alternatively, any other suitable initialization process can be used.

The method of FIG. 2 begins with processor 48 of WLAN device 24 starting a new sliding window, at a window starting operation 80. A sliding window is typically defined as a time interval that is sufficient for collecting performance statistics for the communication packets sent from WLAN device 24 to peer WLAN device 28. At the end of each sliding window, processor 48 typically sets the communication data rate for the next sliding window. The sliding windows are not necessarily of constant duration, and may be extended or shortened by processor 48 as needed. Typical, non-limiting values of the sliding window duration are on the order of 10-100 ms, depending for example on traffic speed. Alternatively, any other suitable durations can be used.

At a packet transmission operation 84, processor 48 transmits communication packets, and optionally probing packets, to peer WLAN device 28. In the first sliding window after initialization of the link, for example, processor 48 transmits only communication packets and not probing packets. Typically, the communication packets are generated by communication packet generator 52, the probing packets (if any) are generated by probing packet generator 56, and scheduler 60 sends all packets to TX 36 for transmission.

At a statistics collection operation 88, statistics calculator 68 collects performance statistics for the communication packets and (if any) for the probing packets. Performance statistics may comprise, for example, a Packet Error Rate (PER) of the communication packets, a PER of the probing packets, a throughput of the communication packets, a throughput of the probing packets, and/or any other suitable performance measure. As noted above, the PER and/or throughput being calculated are typically first-transmission PER and/or throughput (excluding retransmissions).

In an embodiment, for packets (communication packets or probing packets) that are transmitted as MPDUs, statistics calculator 68 calculates the performance statistics based on acknowledgement (ACK) messages received via RX 40 from peer WLAN device 28. Additionally or alternatively, for packets (communication packets or probing packets) that are transmitted as A-MPDUs, statistics calculator 68 calculates the performance statistics based on Block Acknowledgements (BA) messages received via RX 40 from peer WLAN device 28.

The method now splits into two sub-processes. In the sub-process depicted on the left-hand side of the figure, processor 48 uses the statistical performance of the communication packets (i) to configure how channel probing will be performed in the next sliding window, and (ii) to set the communication data rate for the next sliding window. In the sub-process depicted on the right-hand side of the figure, processor 48 uses the statistical performance of the probing packets to set the communication data rate for the next sliding window. The description that follows begins with the probing configuration and then proceeds to describe the setting of the communication data rate, but in reality the two sub-processes typically are performed in parallel in an embodiment.

At a window expiry checking operation 92, processor 48 checks whether the current sliding window has expired. If not expired, the method loops back to operation 84 above. If the sliding window has expired, statistics calculator 68 evaluates the first-transmission PER of the communication packets in the current sliding window, at a communication PER evaluation operation 96. In an embodiment, data rate calculator 64 compares the PER of the communication packets to two PER thresholds denoted TH1 and TH2, wherein TH2>TH1.

If the PER is below TH1 (performance is better than the threshold), then, at a rate setting operation 100, data rate calculator 64 (i) increments the communication data rate to the next-higher data rate and (ii) sets the probing data rate to be one rate higher than the (already incremented) communication data rate. If unable to increment the communication data rate, because the current communication data rate is already the highest rate supported, the communication data rate remains unchanged.)

If the PER is between the two thresholds, i.e., TH1<PER<TH2, then, at a rate setting operation 104, data rate calculator 64 (i) retains the communication data rate unchanged, and (ii) decides not to transmit probing packets in the next sliding window.

If the PER is above TH2 (performance is poorer than the threshold), then, at a rate setting operation 108, data rate calculator 64 (i) decrements the communication data rate to the next-lower data rate and (ii) sets the probing data rate to be one rate lower than the (already decremented) communication data rate. If unable to decrement the communication data rate, because the current communication data rate is already the lowest rate supported, the communication data rate remains unchanged.)

The method then loops back to operation 80 above, in which the next sliding window is started.

At a probing packet checking operation 112, processor 48 checks whether the number of probing packets transmitted in the current sliding window has reached a predefined number which is typically set to a value that is sufficient for accurate estimation of the statistical performance of the probing packets. For MPDU transmission, an example predefined number of probing packets is twenty, although any other suitable value can be used.

If the predefined number of probing packets was not reached, the method loops back to operation 84 above. If the predefined maximum number of probing packets is reached, statistics calculator 68 evaluates the first-transmission PER of the probing packets in the current sliding window, at a probing PER evaluation operation 116.

In an embodiment, data rate calculator 64 compares the PER of the probing packets to two PER thresholds denoted TH1_Probing and TH2_Probing, wherein TH2_Probing>TH1_Probing. TH1_Probing and TH2_Probing are denoted TH1_P and TH2_P, respectively, in FIG. 2. In some embodiments, TH1_Probing and TH2_Probing (the thresholds used for probing packets) are set to the same values as TH1 and TH2 (the thresholds used for communication packets), respectively. In other embodiment, different thresholds are used for probing packets and for communication packets.

If the PER is below TH1_Probing (performance is better than the threshold), then, at a rate setting operation 120, data rate calculator 64 sets the communication data rate to be the current probing data rate, and set the next probing data rate one level higher. (If unable to set the communication data rate in this way, because the current probing data rate is already the highest rate supported, the communication data rate remains unchanged.)

If the PER is between the two thresholds, i.e., TH1_Probing<PER<TH2_Probing, then, at a rate setting operation 124, data rate calculator 64 sets the communication data rate to be equal to the current probing data rate, and stop probing in the current sliding window.

If the PER is above TH2_Probing (performance is poorer than the threshold), then, at a rate setting operation 128, data rate calculator 64 sets the communication data rate to be one rate lower than the current probing data rate. (If unable to set the communication data rate in this way, because the current probing data rate is already the lowest rate supported, the communication data rate remains unchanged.)

The method then loops back to operation 80 above, in which the next sliding window is started.

The flow of FIG. 2 is an example flow, which is depicted solely for the sake of conceptual clarity. In alternative embodiments, any other suitable flow can be used. Moreover, the embodiment described above refers to one possible technique of selecting the communication data rate and the probing data rate by data rate calculator 64. In alternative embodiments, any other suitable technique can be used. Several additional examples are given below.

As noted above, in some embodiments data rate calculator 64 selects the communication data rate for the $n^{th}$ sliding window based on the first-transmission PER and the first-transmission throughput of the communication packets over the $(n-1)^{th}$ sliding window. In one embodiment, data rate calculator 64 selects the communication data rate as the rate having the highest first-transmission throughput within the $(n-1)^{th}$ sliding window, i.e.:

$$\text{Rate}(nT) = \text{argmax}_{r_i \in R} \sum_{t \in [(n-1)T, nT]} \text{Thpt}(r_i, t) \quad \text{Equation 1}$$

wherein Thpt($r_i$,t) denotes the first-transmission throughput of data rate $r_i$ at time t, and R denotes the set of evaluated data rates, and T denotes the duration of the sliding window.

In an alternative embodiment, data rate calculator 64 selects the communication data rate as the rate having the highest effective throughput in the $(n-1)^{th}$ sliding window:

$$\text{Rate}(nT) = \text{argmax}_{r_i \in R} \text{Thpt\_eff}(r_i) \quad \text{Equation 2}$$

The effective throughput Thpt_eff($r_i$) is in turn a function of the first-transmission PER:

$$\text{Thpt}_{eff(r_i)} = (1 - \text{PER}(r_i)) \cdot \log_2(M(r_i)) \cdot CR(r_i) \cdot Nss(r_i) \quad \text{Equation 3}$$

wherein PER($r_i$) denotes the first-transmission PER of data rate $r_i$ over the $(n-1)^{th}$ sliding window, M($r_i$) denotes modulation order of data rate $r_i$, CR($r_i$) denotes the coding rate of data rate $r_i$, and Nss($r_i$) denotes the number of spatial streams of data rate $r_i$.

In yet another embodiment, data rate calculator 64 selects the communication data rate as a function of both the first-transmission throughput and first-transmission PER in the $(n-1)^{th}$ sliding window:

$$\text{Rate}(nT) = F(\text{Thpt}(r_i), \text{PER}(r_i)) \quad \text{Equation 4}$$

Consider, for example, a case in which a first optimal communication data rate, evaluated according to the highest first-transmission throughput criterion (Equation 1) differs from a second optimal communication data rate, evaluated according to the highest first-transmission effective throughput criterion (Equation 2). In an embodiment, data rate calculator 64 selects the communication data rate by (i) taking the higher of the first and second optimal communication data rates, (ii) evaluating the first-transmission PER of this data rate, and (iii) comparing the first-transmission PER to the target PER. If the first-transmission PER is lower than the target PER, then the higher of the first and second optimal communication data rates is selected as the communication data rate for the $n^{th}$ sliding window. Otherwise, the lower of the first and second optimal communication data rates is selected as the communication data rate for the $n^{th}$ sliding window.

Further alternatively, data rate calculator 64 may select the communication data rate for the $n^{th}$ sliding window in any other suitable way and based on any other suitable statistical performance over the $(n-1)^{th}$ sliding window.

In an embodiment, at the beginning of the $n^{th}$ sliding window, data rate calculator 64 sets the probing data rate of the first probing packet based on PER(Rate(nT)), i.e., the first-transmission PER of the communication data rate Rate(nT) chosen for the $n^{th}$ sliding window.

In one example embodiment, if PER(Rate(nT) is below a predefined target PER, TH1_Probing, (e.g., below 10%), data rate calculator 64 sets the probing data rate of the first probing packet to be one rate higher than Rate(nT), (as long as the maximal supported data rate is not exceeded). If PER(Rate(nT)) is above a predefined threshold denoted TH2_Probing, data rate calculator 64 sets the probing data rate of the first probing packet to be one rate lower than Rate(nT), (but only up to the minimal supported data rate).

In the above example, TH2_Probing is typically a function of Rate(nT) and Rate(nT)-1, since the next rate is selected under the assumption that the effective throughput of Rate(nT)-1 should be greater than the effective throughput of Rate(nT), and that the first-transmission PER of the next rate should be lower than the target PER, i.e.:

$$(1-TH2\_\text{Probing}) \cdot \text{Thpt\_eff}(\text{Rate}(nT))) << (1-TH1\_\text{Probing}) \cdot \text{Thpt\_eff}(\text{Rate}(nT)-1)) \quad \text{Equation 5:}$$

In some embodiments, processor 48 holds a table of one or more TH1_Probing values, each value mapped to one or more data rates, and uses the table for setting the probing data rate. In some embodiments the table holds a respective TH1_Probing value for each supported data rate. In other embodiments, a given TH1_Probing value is mapped to two or more data rates, in order to simplify the implementation and reduce the table size.

Continuing the above example, if PER(Rate(nT)) is above the target PER, but below the TH1_Probing value mapped to Rate(nT), data rate calculator 64 decides to not transmit probing packets in the present sliding window.

In various embodiments, processor 48 may adapt the probing data rate (the data rate of the probing packets) based on PER of ACK statistics of probing packets. In some embodiments, the probing packets comprise A-MPDUs, and statistics calculator 68 calculates the PER based on Block ACK (BA) messages received from peer WLAN device 28. A BA message is indicative of failed and successfully-delivered MPDUs within a corresponding A-MPDU. Depending on A-MPDU size, the PER may be calculated per A-MPDU or over multiple A-MPDUs.

In an embodiment, if the PER for the $i^{th}$ probing packet ($i^{th}$ A-MPDU) in the $n^{th}$ sliding window, denoted Probing_Rate(n,i), is lower than the target PER defined for the probing packets, data rate calculator 64 sets the probing data rate of the next $(i+1^{th})$ probing packet to be one rate higher than Probing_Rate(n,i), as long as the maximal supported data rate is not exceeded). In this case, data rate calculator 64 sets the communication data rate to be Probing_Rate(n,i). In an embodiment, the target PER for probing packets is set to be the same as the target PER for communication packets. Alternatively, the target PER for probing packets can be set to be lower than the target PER for communication packets, to avoid an over-aggressive increase in probing data rate.

If PER(Probing_Rate(n,i)) (the PER for the $i^{th}$ probing packet in the $n^{th}$ sliding window) is higher than the target PER defined for the probing packets, but lower than the corresponding PER_higher_th value, data rate calculator 64 decides to stop transmitting probing packets in the present sliding window. In this case, data rate calculator 64 sets the communication data rate to be Probing_Rate(n,i). If Probing_Rate(n,i) is higher than the corresponding PER_higher_th value, data rate calculator 64 decides to stop transmitting probing packets in the present sliding window. In this case, data rate calculator 64 sets the communication data rate to be Probing_Rate(n,i)−1.

In the above example, the probing packets comprise A-MPDUs. In alternative embodiments, the probing packets comprise individual MPDUs, in which case processor adapts the probing data rate based on ACK messages received from peer WLAN device 28.

In one example embodiment, if for a probing data rate Probing_Rate(n,i), a sequence of at least Num_RateUp_Acks successive ACKs is received (wherein Num_RateUp_Acks is a predefined threshold), data rate calculator 64 sets the probing data rate for the next probing packet to be one rate higher, i.e., Probing_Rate(n,i+1)=Probing_Rate(n,i)+1 (up to the maximal rate supported). In this case, data rate calculator 64 sets the communication data rate to Probing_Rate(n,i).

Continuing the above example, if for a probing data rate Probing_Rate(n,i), a sequence of at least Num_RateDown_No_Acks MPDUs receive no ACKs (wherein Num_RateDown_No_Acks is a predefined threshold), data rate calculator 64 sets the probing data rate for the next probing packet to be one rate lower, i.e., Probing_Rate(n,i+1)=Probing_Rate(n,i)−1 (up to the minimal rate supported). In this case, data rate calculator 64 sets the communication data rate to Probing_Rate(n,i). If Probing_Rate(n,i+1) is the same as the current communication data rate Rate(nT), data rate calculator 64 stops transmission of probing packets in the current sliding window. Otherwise, data rate calculator 64 sets the communication data rate to be Probing_Rate(n,i).

Typically, the target PER is determined by the ratio between Num_RateUp_Acks and Num_RateDown_No_Acks, which converges to:

$$\text{Target\_PER} = \frac{\text{Num\_RateDown\_No\_Acks}}{\text{Num\_RateDown\_No\_Acks} + \text{Num\_RateUp\_Acks}} \quad \text{Equation 6}$$

Thus, in an embodiment, in order to achieve the target PER, the ratio between Num_RateUp_Acks and Num_RateDown_No_Acks should be set to:

$$\frac{\text{Num\_RateUp\_Acks}}{\text{Num\_RateDown\_No\_Acks}} = \frac{1}{\text{Target\_PER}} - 1 \quad \text{Equation 7}$$

Figure 3:
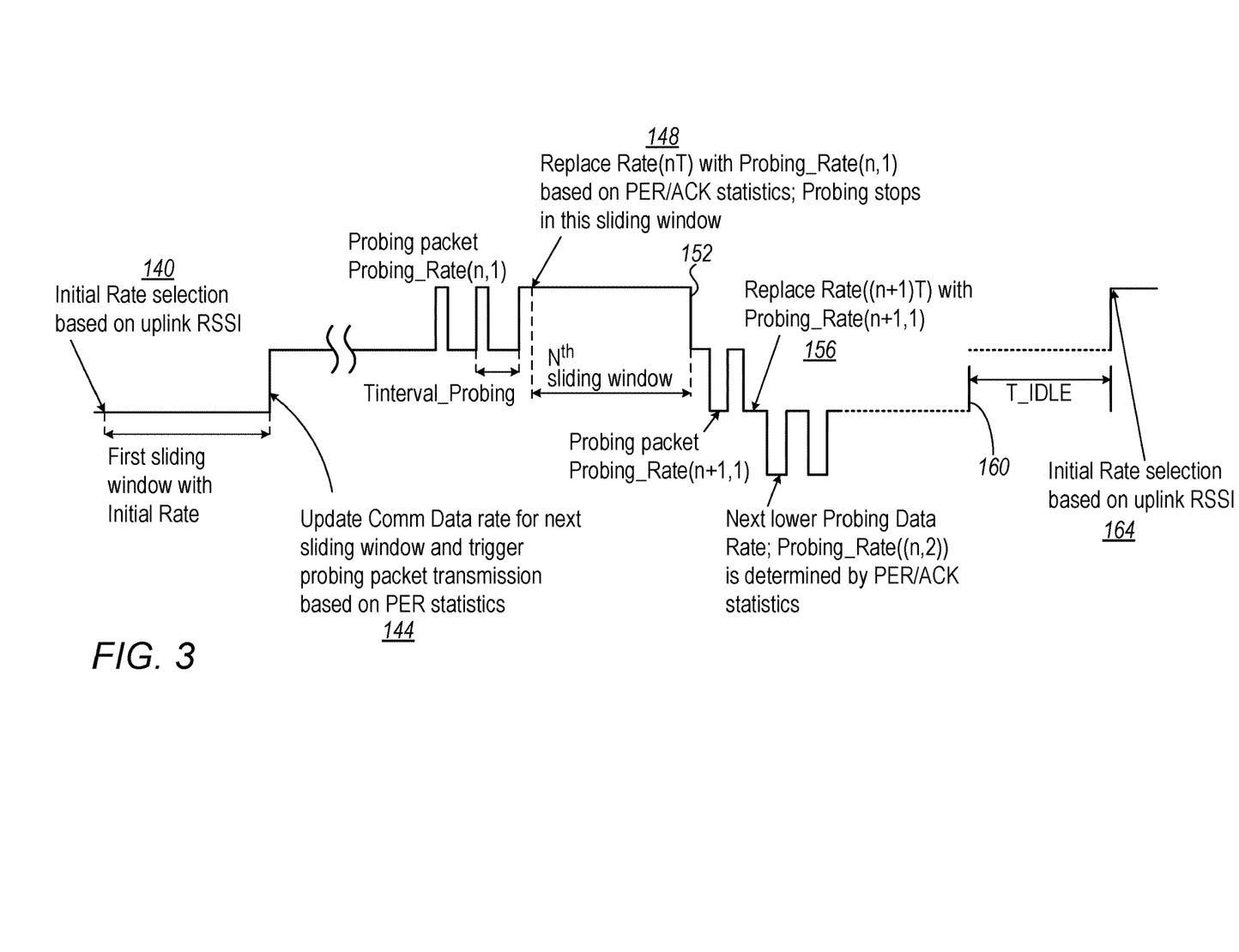
FIG. 3 is a diagram that schematically illustrates an example scenario of rate adaptation in a WLAN link over time, in accordance with an embodiment that is described herein.

FIG. 3 is a diagram that schematically illustrates an example scenario of rate adaptation in WLAN device 24 over time, in accordance with an embodiment that is described herein. Starting from the left-hand side of FIG. 3, processor 48 begins the first sliding window at a time 140. At this time, e.g., upon initial establishment of the WLAN link between devices 24 and 28, no performance statistics are available. Data rate calculator 64 thus sets the communication data rate based on the RSSI and/or SNR of the reverse-channel signal received from peer WLAN device 28. During the first sliding window, no probing packets are transmitted.

A time 144 marks the end of the first sliding window, in which no probing packets were transmitted. As noted above, in some embodiments the duration of the first sliding window (and the duration of subsequent sliding window) is on the order of 10-100 ms. At this time, data rate calculator 64 sets the communication data rate for the next sliding window based on the PER statistics collected during the first sliding window, and also triggers transmission of probing packets in the next sliding window.

In the present example, the communication data rate is set to be one rate higher than the initially-selected communication data rate, and the probing data rate is set to be one rate higher than the newly-set communication data rate (as in operation 100 of FIG. 2). As seen in the figure, the next sliding window proceeds with transmission of both communication packets and probing packets. The time interval between successive probing packets is denoted Tinterval_Probing, and is typically a system-configurable parameter.

A time 148 marks the end of the $(n-1)^{th}$ sliding window and the beginning of the $n^{th}$ sliding window. In the present example, at this time data rate calculator 64 decides to set the communication data rate for the $n^{th}$ sliding window to be the same as the probing data rate used in the $(n-1)^{th}$ sliding window, and to not transmit probing packets in the $n^{th}$ sliding window (as in operation 104 of FIG. 2). The $n^{th}$ sliding window proceeds in this manner.

A time 152 marks the end of the $n^{th}$ sliding window. In the present example, at this time data rate calculator 64 decides to decrement the communication data rate, and to set the probing data rate to one rate lower than the newly-set communication data rate (as in operation 108 of FIG. 2).

At a time 156, data rate calculator 64 decides to set the communication data rate to be the same as the current probing data rate, and to transmit probing packets at the next-lower rate in the next sliding window. The communication data rate remains the same.

At a time 160, the WLAN link between devices 24 and 28 becomes idle for a period denoted T IDLE. The link is re-established at a time 164. In an embodiment, processor 48 treats this period of inactivity similarly to initial link establishment, i.e., sets the communication data rate based on the RSSI and/or SNR of the received reverse-channel signal. In some embodiment, processor 48 reverts to initial setting of the communication data rate if the inactivity period exceeds a predefined duration threshold.

Although the embodiments described herein mainly address WLAN communication in the presence of variable channel conditions, the methods and systems described herein can also be used in various other applications.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for rate adaptation in a communication device, the method comprising:
   during a time interval, transmitting over a wireless channel to a peer communication device both (i) communication packets that carry user data, at a communication data rate, and (ii) channel-probing packets for probing channel conditions, at a channel-probing data rate that is derived from the communication data rate;
   estimating, over the time interval, a first statistical performance of the communication packets and a second statistical performance of the channel-probing packets; and
   setting the communication data rate for a subsequent time interval based on at least one of the first statistical performance and the second statistical performance.

2. The method according to claim 1, further comprising deciding, based on the first statistical performance of the communication packets, whether or not to transmit the channel-probing packets in the subsequent time interval.

3. The method according to claim 1, further comprising deciding, based on the first statistical performance of the communication packets, whether to increase or decrease the channel-probing data rate in the subsequent time interval relative to the time interval.

4. The method according to claim 1, further comprising:
   when the first statistical performance of the communication packets is better than a first performance threshold, increasing the channel-probing data rate for the channel-probing packets in the subsequent time interval relative to the time interval;
   when the first statistical performance is poorer than a second performance threshold, decreasing the channel-probing data rate in the subsequent time interval relative to the time interval; and
   when the first statistical performance is between the first performance threshold and the second performance threshold, deciding not to transmit the channel-probing packets in the subsequent time interval.

5. The method according to claim 1, wherein setting the communication data rate for the subsequent time interval comprises:
   when the second statistical performance of the channel-probing packets is better than a first performance threshold, increasing the communication data rate in the subsequent time interval relative to the time interval;
   when the second statistical performance is poorer than a second performance threshold, decreasing the communication data rate in the subsequent time interval relative to the time interval; and
   when the second statistical performance is between the first performance threshold and the second performance threshold, retaining the communication data rate in the subsequent time interval as in the time interval.

6. The method according to claim 1, and comprising, upon initial establishment of a link with the peer communication device or following inactivity of the link, initializing the communication data rate based on a quality of a reverse-channel signal received from the peer communication device.

7. The method according to claim 1, wherein estimating the first statistical performance and the second statistical performance comprises estimating performance measures indicative of throughputs of the communication packets and of the channel-probing packets.

8. The method according to claim 1, wherein estimating the first statistical performance and the second statistical performance comprises estimating performance measures indicative of error rates of the communication packets and of the channel-probing packets.

9. The method according to claim 1, wherein estimating the first statistical performance and the second statistical performance is performed based only on first-transmissions of the communication packets and the channel-probing packets, excluding retransmissions.

10. The method according to claim 1, comprising, at least at a given time, setting the communication data rate to be different from the channel-probing data rate.

11. A communication device comprising:
    a transmitter, configured to transmit signals over a wireless channel to a peer communication device; and
    a processor, configured to:
    during a time interval, transmit to the peer communication device, using the transmitter, both (i) communication packets that carry user data, at a communication data rate, and (ii) channel-probing packets for probing channel conditions, at a channel-probing data rate that is derived from the communication data rate;
    estimate, over the time interval, a first statistical performance of the communication packets and a second statistical performance of the channel-probing packets; and
    set the communication data rate for a subsequent time interval based on at least one of the first statistical performance and the second statistical performance.

12. The communication device according to claim 11, wherein the processor is further configured to decide, based on the first statistical performance of the communication packets, whether or not to transmit the channel-probing packets in the subsequent time interval.

13. The communication device according to claim 11, wherein the processor is further configured to decide, based on the first statistical performance of the communication packets, whether to increase or decrease the channel-probing data rate in the subsequent time interval relative to the time interval.

14. The communication device according to claim 11, wherein the processor is further configured to:
    when the first statistical performance of the communication packets is better than a first performance threshold, increase the channel-probing data rate for the channel-probing packets in the subsequent time interval relative to the time interval;
    when the first statistical performance is poorer than a second performance threshold, decrease the channel-probing data rate in the subsequent time interval relative to the time interval; and
    when the first statistical performance is between the first performance threshold and the second performance threshold, decide not to transmit the channel-probing packets in the subsequent time interval.

15. The communication device according to claim 11, wherein the processor is configured to set the communication data rate for the subsequent time interval by:
  when the second statistical performance of the channel-probing packets is better than a first performance threshold, increasing the communication data rate in the subsequent time interval relative to the time interval;
  when the second statistical performance is poorer than a second performance threshold, decreasing the communication data rate in the subsequent time interval relative to the time interval; and
  when the second statistical performance is between the first performance threshold and the second performance threshold, retaining the communication data rate in the subsequent time interval as in the time interval.

16. The communication device according to claim 11, wherein, upon initial establishment of a link with the peer communication device or following inactivity of the link, the processor is configured to initialize the communication data rate based on a quality of a reverse-channel signal received from the peer communication device.

17. The communication device according to claim 11, wherein the processor is configured to estimate the first statistical performance and the second statistical performance by estimating performance measures indicative of throughputs of the communication packets and of the channel-probing packets.

18. The communication device according to claim 11, wherein the processor is configured to estimate the first statistical performance and the second statistical performance by estimating performance measures indicative of error rates of the communication packets and of the channel-probing packets.

19. The communication device according to claim 11, wherein the processor is configured to estimate the first statistical performance and the second statistical performance based only on first-transmissions of the communication packets and the channel-probing packets, excluding retransmissions.

20. The communication device according to claim 11, wherein, at least at a given time, the processor is configured to set the communication data rate to be different from the channel-probing data rate.

* * * * *